United States Patent [19]

Dallmer

[11] 4,235,292
[45] Nov. 25, 1980

[54] HOOF COVERING

[76] Inventor: Helmuth Dallmer, No. 25, Wiebelsheidestrasse, 5760 Arnsberg 1, Fed. Rep. of Germany

[21] Appl. No.: 28,936

[22] Filed: Apr. 11, 1979

[30] Foreign Application Priority Data

Jan. 20, 1979 [DE] Fed. Rep. of Germany ....... 2902189

[51] Int. Cl.³ ............................ A01L 1/04; A01L 7/04
[52] U.S. Cl. .......................................... 168/4; 168/32; 168/DIG. 1
[58] Field of Search ................. 168/4, 35, DIG. 1, 36, 168/37, 38, 39, 32, 29

[56] References Cited

U.S. PATENT DOCUMENTS

| | | | |
|---|---|---|---|
| 1,191,002 | 7/1916 | Hershberger | 168/35 |
| 2,024,265 | 12/1935 | Anderson et al. | 168/4 |
| 2,197,166 | 4/1940 | Wheeler et al. | 168/4 |
| 3,050,133 | 8/1962 | Ketner et al. | 168/4 |
| 3,494,422 | 2/1970 | Clark | 168/4 |

*Primary Examiner*—Hugh R. Chamblee
*Attorney, Agent, or Firm*—John C. Smith, Jr.

[57] ABSTRACT

A hoof covering for horses comprises a horseshoe-shaped plastic body made integrally of wear-resistant plastic material and having a generally acute-angled cross section. The plastic body has a lower side with a substantially planar tread surface and a planar upper surface which serves as a support for a hoof of a horse, and an upwardly extending side in the form of a side wall capable of being bent into the desired shape for mounting the hoof covering on the hoof by adhesive means. The lower side of the plastic body defines a horseshoe-shaped groove opening into the substantially planar tread surface. A horseshoe-shaped steel yoke is retained in the groove and has a plurality of spaced-apart steel calks which project through the horseshoe-shaped groove and beyond the tread surface of the plastic body. This groove is in the cross-sectional region of its opening slightly narrower than the steel yoke. Screwable connection elements may be provided between the steel yoke and the calks.

6 Claims, 7 Drawing Figures

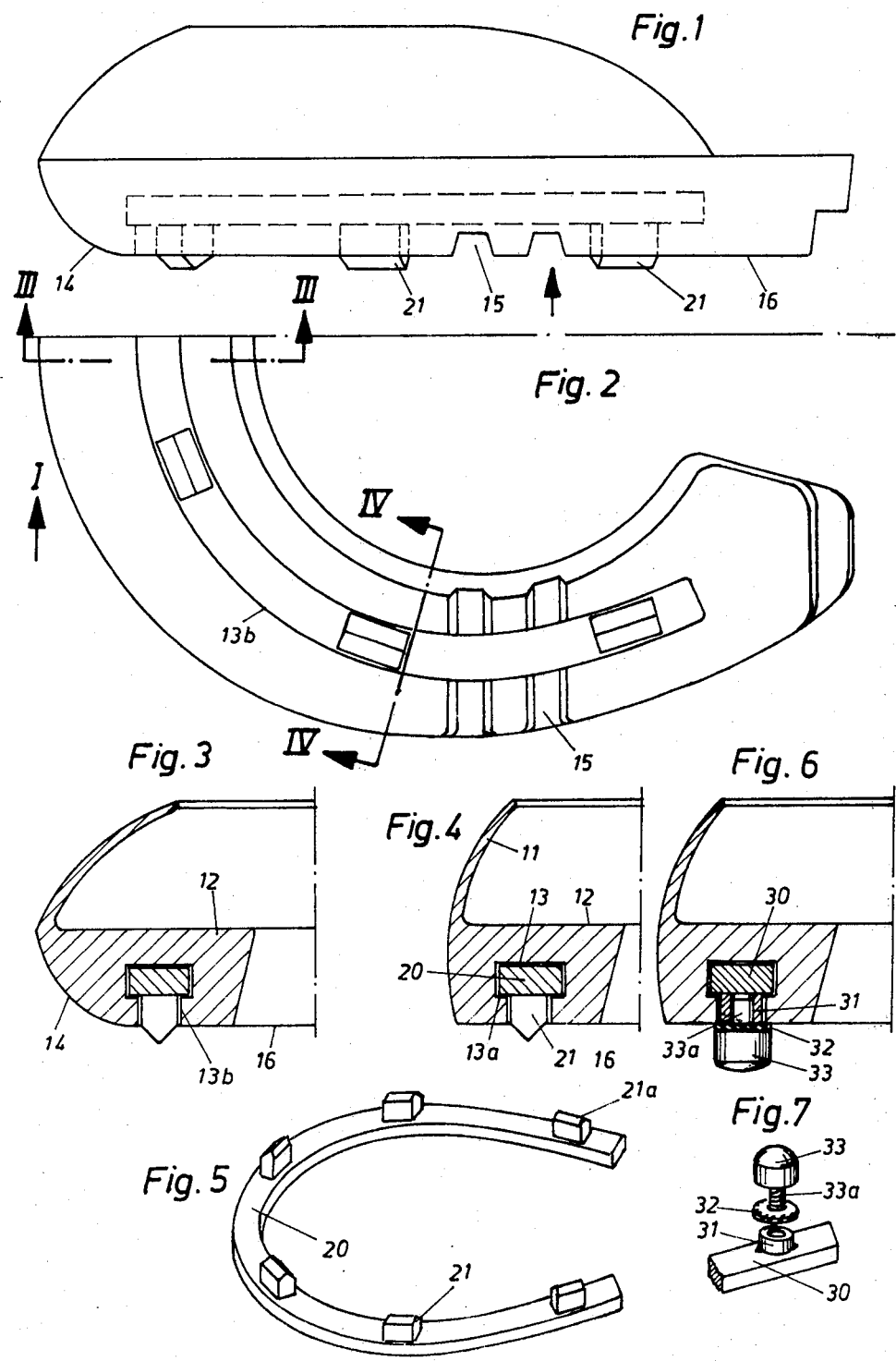

HOOF COVERING

BACKGROUND OF THE INVENTION

This invention relates to a hoof covering of plastic including a horseshoe-shaped steel yoke. Same is inserted into a groove formed in the hoof covering, the cross section of said groove being a little smaller in the region of the groove opening than that of the steel yoke.

The steel yoke is intended to stabilize the arcuate shape of the hoof covering. It is conformed to the arcuate shape of the horse hoof and inserted into the groove, the hoof covering conforming to the arcuate shape. Then the hoof covering is adhered to the horse hoof. In view of slip-proofness, at a tread surface of the hoof covering projecting steel elements are connected to the steel yoke.

In a prior art hoof covering of this type (German Offenlegungsschrift No. 2,716,968) a groove dovetail-shaped in cross section is provided which is open upwardly, i.e. to a planar surface of the hoof covering provided for adhesion. To guard against slipping, steel spikes are attached to the bottom side of the steel yoke which upon inserting the steel yoke are struck through the plastic of the hoof covering.

SUMMARY OF THE INVENTION

It is the object of the present invention to provide a hoof covering for horses which is economic to produce and which insures an improved slip-proofness.

To attain this object the present invention provides a hoof covering for horses comprising (a) a horseshoe-shaped plastic body made integrally of wear-resistant plastic material and having a generally acute-angled cross section, said plastic body having a lower side with a substantially planar tread surface and a planar upper surface which serves as a support for a hoof of a horse, and an upwardly extending side in the form of a side wall capable of being bent into the desired shape for mounting the hoof covering on the hoof by adhesive means, said lower side of said plastic body defining a horseshoe-shaped groove opening into said substantially planar tread surface, and (b) a horseshoe-shaped steel yoke retained in said groove and having a plurality of spaced-apart steel calks depending at least indirectly connected from the steel yoke and projecting through the horseshoe-shaped groove and beyond the substantially planar tread surface of the plastic body, said groove in the cross-sectional region of its opening being slightly narrower than the steel yoke.

In such a hoof covering, steel calks are provided to guard against slipping. They may be formed at least as wide as the groove in the opening region. Accordingly, their plan area and accordingly their breaking and shearing strength are by far more increased than for the steel spikes of prior art, thereby also the resistance of the hoof covering against slipping being enhanced. The groove is closed upwardly so that the upper planar surface of the hoof covering is available unobstructedly as adhesion surface.

According to a further development of the invention, a two-stepped rectangular groove cross section is provided for. It on the one hand insures a positive mechanical retention of the steel yoke, and on the other hand there is sufficient space for receiving the steel calks or the associated connecting elements. Either integrally formed steel calks or steel calks detachable by a screw connection may be provided for. The latter may be removed by the rider as desired, if they are not needed. For improving slip-proofness, steel yokes may be employed which have calks integrally formed and having a rectangular shape in plan view provided with a blade in longitudinal direction of the calks. Since the blades are respectively arranged parallel to the yoke axis, they respectively have different angular positions in relationship to direction of riding.

The insertion of the steel yoke into the groove is facilitated when the steel yoke has rolled out, i.e. slightly rounded edges.

BRIEF DESCRIPTION OF THE DRAWING

Two embodiments of the invention will now be described by way of example and with reference to the accompanying drawing in which:

FIG. 1 is a side elevational view, viewed in direction of arrow I in FIG. 2, of a hoof covering according to the invention;

FIG. 2 is a view from underneath, viewed in the direction of the arrow in FIG. 1;

FIG. 3 is a cross-sectional view taken along the line III—III of FIG. 2;

FIG. 4 is a further cross-sectional view taken along the line IV—IV of FIG. 2;

FIG. 5 is a perspective illustration from underneath, on a reduced scale, of the steel yoke belonging to the hoof covering according to FIGS. 1 to 4;

FIG. 6 is a cross-sectional view of a hoof covering according to another embodiment, the steel yoke of this hoof covering being provided with detachable calks, and FIG. 7 is a perspective illustration of a portion of the steel yoke according to FIG. 6.

DESCRIPTION OF THE PREFERRED EMBODIMENTS

The drawing shows a hoof covering for horses which comprises a body made of plastic suitable for this purpose. In a plan view, it is conventionally horseshoe-shaped. It is bonded to the hoof of a horse. It engages the horse hoof with an upper planar surface 12. A further surface 11 located inwardly at an integrally formed upwardly extending side wall of the hoof covering laterally engages the horse hoof. The two surfaces 11 and 12 are connected to the horse hoof by means of an adhesive.

At the bottom side of the plastic body of the hoof covering having a generally acute-angled cross section, a substantially planar tread surface 16 is defined. Thereat, there are grooves 15 transverse of the riding direction. For stabilizing the hoof covering according to FIGS. 1 to 4, a horseshoe-shaped steel yoke 20 according to FIG. 5 is provided. The cross section of the steel yoke 20 is substantially rectangular. At a planar surface of the steel yoke, six steel calks 21 rectangular in a plan view are integrally formed therewith. At each calk 21 a blade 21a is defined in the longitudinal direction thereof, said blade being arranged parallel to the yoke axis.

For receiving the steel yoke 20, a groove 13 is provided in the plastic body, the cross section of said groove being composed of a wide rectangle 13a and a smaller rectangle 13b open toward the tread surface 16.

Before the hoof covering is adhered, the steel yoke 20 conformed to the horse hoof in its arcuate shape is inserted into the groove 13 by applying pressure. The hoof covering conforms itself to the steel yoke 20 regarding its arcuate shape. The steel yoke is retained positively mechanically in the wide portion 13a of the groove 13. The integrally formed calks 21 are accommodated by the narrower portion 13b of the groove 13. At least the blades 21a thereof project from the tread surface 16.

At the leading arcuate region of the hoof covering, an arch 14 is defined which extends from the upwardly extending side wall of the hoof covering to the groove 13.

FIGS. 6 and 7 show a steel yoke 30 according to another embodiment which is provided with detachable calks 33 having a circular-cylindrical shape. At each calk 33, a screw 33a is defined. Same is screwed into a nut 31 welded to the steel yoke 30. By an intermediate dog disc 32, an optimum retention of the screw connection is insured.

When the steel yoke 30 has been placed into the hoof covering the nuts 31 are accommodated by the smaller rectangle 13b of the groove 13.

The invention may be embodied in other specific forms without departing from the spirit or the essential characteristics thereof. The embodiments are therefore to be considered in all respects as illustrative and not restrictive.

What is claimed is:

1. A hoof covering for horses comprising:
   (a) a horseshoe-shaped steel yoke of predetermined configuration conforming to the arcuate shape of a hoof of a horse and having a predetermined thickness;
   (b) a horseshoe-shaped plastic body formed integrally of wear-resistant plastic material, said plastic body having a lower side with a substantially planar tread surface, a planar upper surface which serves as a support for the hoof and an upwardly extending side wall disposed about at least a major portion of said horseshoe-shaped plastic body and capable of being bent into the desired shape for mounting the hoof covering on the hoof by adhesive means, said lower side of said plastic body defining a horseshoe-shaped groove opening into said substantially planar tread surface, said groove having a depth greater than said predetermined thickness of said horseshoe-shaped steel yoke;
   (c) said horseshoe-shaped steel yoke of predetermined configuration being positioned in said horseshoe-shaped groove of said plastic body;
   (d) means for retaining said horseshoe-shaped steel yoke in said horseshoe-shaped groove of said plastic body; and
   (e) a plurality of calks secured to said steel yoke at spaced intervals and projecting beyond said substantially planar tread surface of said plastic body.

2. A hoof covering according to claim 1, wherein the steel yoke is rectangular in cross section and is accommodated by a portion of the groove conformed to the cross section thereof, adjacent to which portion there is provided in the opening region a narrower rectangular portion.

3. A hoof covering according to claim 1, wherein the calks are formed integral with the steel yoke.

4. A hoof covering according to claim 1, wherein at least one of the calks is rectangular in plan view and includes a blade extending in the direction of the yoke axis.

5. A hoof covering according to claim 1, wherein the calks are provided with screws which are capable of being screwed into nuts welded to the steel yoke.

6. A hoof covering according to claim 6 wherein the exposed surface of said steel yoke in said horseshoe-shaped groove of said plastic body is within said groove a spaced distance from said planar tread surface of said plastic body, and said means for retaining said horseshoe-shaped steel yoke in said horseshoe-shaped groove of said plastic body comprises an extension of said plastic body from at least one side of said groove over said horseshoe-shaped steel yoke such that the width of said groove at said substantially planar tread surface is narrower than the width of said horseshoe-shaped steel yoke, said plurality of calks projecting from said steel yoke through the narrower portion of said horseshoe-shaped groove and beyond said substantially planar tread surface of said plastic body.

* * * * *